(12) United States Patent
Sato et al.

(10) Patent No.: US 6,399,009 B1
(45) Date of Patent: Jun. 4, 2002

(54) MICROMETER, METHOD FOR MANUFACTURING CYLINDRICAL COMPONENT FOR MICROMETER

(75) Inventors: Hajime Sato; Kiyohiro Nakata; Chikashi Hamano; Toshihiko Mishima, all of Kure; Tohru Fujimitsu, Higashihiroshima, all of (JP)

(73) Assignee: Mitutoyo Corporation, Kawasaki (JP)

( * ) Notice: Subject to any disclaimer, the term of this patent is extended or adjusted under 35 U.S.C. 154(b) by 121 days.

(21) Appl. No.: 09/626,308

(22) Filed: Jul. 26, 2000

Related U.S. Application Data

(62) Division of application No. 09/092,815, filed on Jun. 8, 1998, now Pat. No. 6,115,934.

(30) Foreign Application Priority Data

Jun. 13, 1997 (JP) .............................. 9-156646

(51) Int. Cl.⁷ .................... B29C 45/16; B29C 59/16
(52) U.S. Cl. ................... 264/400; 264/446; 264/482; 264/139; 264/247; 264/255; 264/263; 264/279
(58) Field of Search ................. 264/400, 482, 264/446, 139, 173.18, 255, 253, 260, 263, 279.1, 328.1, 245, 246, 247; 33/813, 830, 831

(56) References Cited

U.S. PATENT DOCUMENTS

| | | | | |
|---|---|---|---|---|
| 1,612,825 A | * | 1/1927 | Lynch | 264/245 |
| 2,285,963 A | * | 6/1942 | Gits et al. | 264/247 |
| 3,086,250 A | * | 4/1963 | Gits | 264/161 |
| 3,787,982 A | | 1/1974 | Anderson | |
| 4,040,670 A | * | 8/1977 | Williams | 301/5.308 |
| 4,077,129 A | | 3/1978 | Nishikata | |
| 4,550,507 A | | 11/1985 | Nishikata | |
| 4,657,419 A | * | 4/1987 | Takakuwa | 400/490 |
| 4,676,941 A | * | 6/1987 | Shiho et al. | 264/247 |
| 4,753,863 A | * | 6/1988 | Spanjer | 430/138 |
| 5,603,796 A | * | 2/1997 | Baker | 156/272.8 |
| 5,760,120 A | | 6/1998 | Itoh et al. | |
| 6,228,306 B1 | * | 5/2001 | Hoepfl et al. | 264/254 |

* cited by examiner

Primary Examiner—Jan H. Silbaugh
Assistant Examiner—Stefan Staicovici
(74) Attorney, Agent, or Firm—Oliff & Berridge, PLC

(57) ABSTRACT

A thimble 61 formed with graduations 65 and numerals 67 on the outer circumference thereof at predetermined intervals is molded by double-color molding using two kinds of resin 62, 63 with different colors. After a molding product having the graduations 65 protruding outwardly on the outer circumference of a base tube 64 is formed of the resin 62, an outer skin 66 covering the outside of the base tube 64 except for the graduations 65 is formed of the resin 63. Thereafter, the numerals 67 is formed on the outer skin 66 by means of laser marking. Similarly, an outer sleeve is formed with graduations and numerals on the outer circumferential surface along the axial direction at predetermined intervals.

5 Claims, 11 Drawing Sheets

MICROMETER, METHOD FOR MANUFACTURING CYLINDRICAL COMPONENT FOR MICROMETER

This is a division of application Ser. No. 09/092,815 filed Jun. 8, 1998, now U.S. Pat. No. 6,115,934. The entire disclosure of the prior applications is hereby incorporated by reference herein in its entirety.

BACKGROUND OF THE INVENTION

1. Field of the Invention

This invention relates to a micrometer, and a method for manufacturing cylindrical component for a micrometer. More specifically, it relates to a micrometer of which manufacturing cost and weight is reduced and a method for manufacturing an outer sleeve and a thimble used as components of the micrometer.

2. Description of the Related Art

As shown in FIG. 19, a micrometer comprises an almost U-shaped main body 101, an anvil 102 held at an end portion of the main body 101, a spindle 104 screwed into the other end portion of the main body 101 through an inner sleeve 103 to-move toward and away from the anvil 102, an outer sleeve 105 placed and fixed onto the outside of the inner sleeve 103, a thimble 106 rotatably covered on the outside of the outer sleeve 105 and integrally connected with the spindle 104, and a ratchet mechanism 107 which slips when an excess load is applied on the spindle 104, and is provided at the rear end of the spindle 104.

On the outer circumferential surface of the outer sleeve 105, graduations 108A and numerals 108B of a main scale are formed at a predetermined pitch along the axial direction, and on the outer circumferential surface of the thimble 106, a graduation 109 of a vernier scale is formed at a predetermined pitch along the circumferential direction. By these graduations 108, 109, the amount of displacement of the spindle 104 to the anvil 102 can be measured. In other words, dimensions of the object which is held between the anvil 102 and the spindle 104 can be measured.

Conventionally, in forming the graduations 108A, 109A and numerals 108B, 109B, after the outlines of the graduations 108A, 109A and numerals 108B, 109B are formed by means of engraving or carving on the outer circumferential faces of the outer sleeve 105 and the thimble 106 fabricated in a predetermined cylinderical shape in advance, sumi ink is coated in the formed outlines, and then a baking treatment is carried out.

In the conventional forming method of the graduations 108A, 109A and numerals 108B, 109B, however, since the outlines of the graduations 108A, 109A and numerals 108B, 109B need to be carved or engraved one by one, considerable effort and time are required. Furthermore, after sumi ink is coated on portions formed by engraving or carving, the baking treatment is performed, so that the number of processes and costs are increased.

Since the outer sleeve 105 and the thimble 106 are conventionally formed of metal, they are heavy in weight and also bring up a disadvantage of spoiling the handling properties and operability, for a micrometer which to measure an object while holding it in one hand.

It is an object of the present invention to provide a micrometer which enables reduction in cost and weight.

It is another object of the present invention to provide manufacturing method of a cylindrical component for micrometer such as an anvil and a thimble which makes it possible to reduce the cost and the size.

SUMMARY OF THE INVENTION

A micrometer according to present invention, which comprises a main body holding an anvil at one end portion thereof and a spindle moving to and away from the anvil at the other end portion thereof through an inner sleeve, an outer sleeve covering the outside of the inner sleeve and fixed thereon, and a thimble unitedly connected to the spindle on the outside of the outer sleeve in a manner that the thimble rotates, said outer sleeve being provided with graduations and numerals on the outer circumferential surface along the axial direction, and the thimble being provided with graduations and numerals on the outer circumference thereof, is characterized in that at least one of said outer sleeve and said thimble comprises a base tube formed of a first resin and having the graduations protruding toward the outside on the outer circumferential surface thereof at predetermined intervals, and an outer skin formed of a second resin having a different color from that of the first resin and covering the outer circumference of said base tube except for the graduations, and the numerals are formed adjacent to the graduations.

According to the micrometer as structured above, since at least one of the outer sleeve and the thimble is formed with the graduations through the double-color molding using two kinds of resin having different colors, the cost and time needed for the manufacturing is reduced as compared with a conventional method for forming graduations by means of carving or engraving.

Furthermore, since the micrometer is made of resin, the weight is reduced as compared with a micrometer made of metal to improve the handling properties and operability of a micrometer in the measurement while being held with a hand.

In the aforementioned structure, for example, the second resin may be a resin which changes color thereof by irradiation of a laser beam, and the numerals may be formed by a discolored layer discolored by irradiation of the laser beam.

Alternatively, the second resin may be a resin peelable by irradiating a laser beam, and the numerals may be formed by a slit made by peeling of the second resin by the irradiation of the laser beam.

Thus, the numerals are formed efficiently.

The numerals as well as the graduations may be formed by the first resin to protrude outwardly on the base tube, and the outside of the base tube except for the graduations and the numerals may be covered with the outer skin.

By the above structure, the micrometer is formed including the graduations and the numerals through the double-color molding using two kinds of resin having different colors, in other words, the micrometer is formed with the numerals by means of the double-color molding, so that the manufacturing cost and the time for manufacturing are reduced further than the micrometer having the aforementioned structure.

Any structure can be employed for the main body. For example, it is advisable that the main body has a frame formed by a bending process of a metal plate formed in a predetermined shape, and the frame is formed with an anvil holding portion for holding the anvil on an end thereof and an inner sleeve holding portion for holding the inner sleeve on the other end thereof by a bending process.

In this point, as the metal plate, materials being light in weight and having high rigidity is preferable, such as a cold-rolled steel (SPC-C). Compared with a casting obtained by a conventional casting, the cost and the weight are reduced while the deformation caused by a measuring force is restrained, that is, the rigidity required in measuring is retained since the frame formed by means of bending the metal plate is used. As a result, the weight of the main body as well as the outer sleeve and the thimble is reduced, so that the total weight of the micrometer is reduced. Therefore, the improvement of the handling properties and the operability is promised. Moreover, since the weight of the micrometer is reduced not partially but totally, the weight balance which is an important property in using a micrometer can be maintained good.

A method for manufacturing a cylindrical component for a micrometer according to the present invention, the cylindrical component for a micrometer having graduations and numerals on the outer circumferential surface of a base tube thereof along the axial direction, is characterized by comprising the steps of molding primary molding product by a first resin, the primary molding product having the base tube and the graduations protruding outwardly on the outer circumferential surface of the base tube along the axial direction at predetermined intervals, forming outer skin by a second resin to cover the outside of the base tube except for the graduations, the second resin having a different color from that of the first resin, and irradiating a laser beam on the outer skin to form the numerals thereon.

According to the aforementioned methods, the base tube and the primary molding product having the graduations protruding outwardly from the outer circumferential surface of the base tube are formed first using the first resin, and using the second resin with a different color from that of the first resin, the outer skin is formed to cover the outside of the base tube except for the graduations, and then the numerals are formed on the outer skin by means of irradiating a laser beam. Therefore, the manufacturing cost and the time for manufacturing are decreased further than that of the conventional method manufacturing an outer sleeve and a thimble for a micrometer. Moreover, since the micrometer is made of resin, the weight is reduced as compared with the formation with metal.

In the aforementioned structure, in order to form the numerals on the outer skin, for example, the second resin may be a resin which changes color thereof by irradiation of a laser beam, and a laser beam is irradiated on the second resin to change color thereof on the irradiated portion to form the numerals by the discolored layer.

Alternatively, the second resin may be a resin peelable by irradiating a laser beam, and a laser beam is irradiated on the second resin to peel off the irradiated portion of the second resin and to form the numerals by slits thereby formed.

DETAILED DESCRIPTION OF THE PREFERRED EMBODIMENT(S)

A preferred embodiment of the present invention will now be explained below with reference to the drawings.

Figure 1:
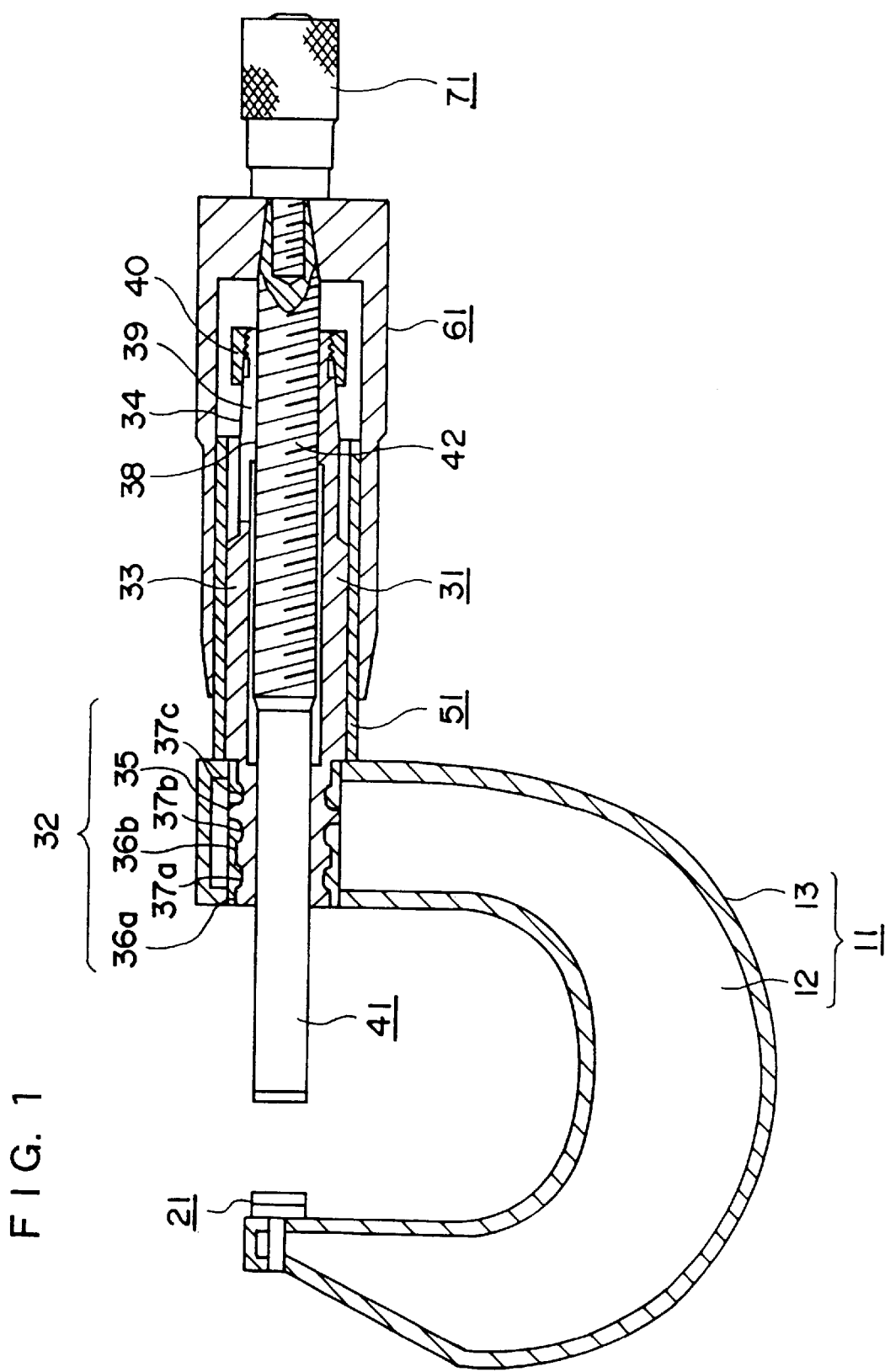
FIG. 1 is a sectional view showing a preferred embodiment of a micrometer according to the present invention.

FIG. 1 is a sectional view showing a micrometer of a first embodiment. The micrometer has an almost U-shaped main body 11, a metal (such as cemented carbide) anvil 21 held by one end portion of the main body 11, a spindle 41 made of a metal (such as alloy tool steel: SKS-3), screwed in a movable manner toward and away from the anvil 21 at the other end portion of the main body 11 through an inner sleeve 31, an outer sleeve 51 covered on and fixed to the outside of the inner sleeve 31, a thimble 61 covered in a rotatable manner to the outside of the outer sleeve 51 and integrally connected to the spindle 41, and a ratchet mechanism 71 which is provided at the rear end of the spindle 41 and slips when an excess load is applied on the spindle 41.

The main body 11 is constituted of a frame 12 formed by a bending process of a metal plate stamped out in a designated shape and size, and a resin 13 to cover the outer surface of the frame 12. In other words, the main body 11 is of laminated structure, in which the resin 13 is injection-molded on the outside of the frame 12, using the metal plate frame 12 as an insert part.

Figure 2:
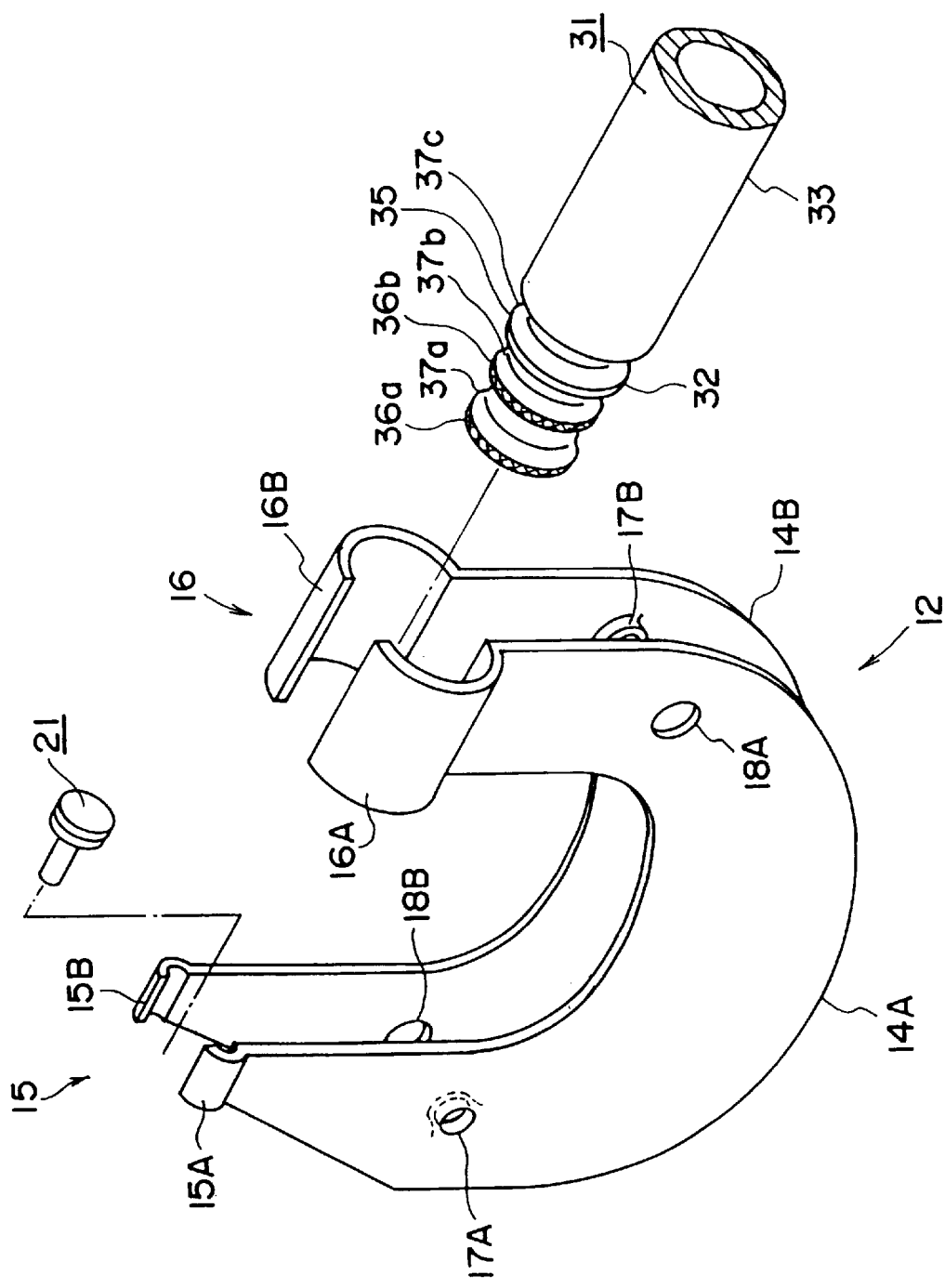
FIG. 2 is a perspectively exploded view showing fragments of the above embodiment.

As shown in FIG. 2, the frame 12 is formed with a pair of the frame elements 14A and 14B which are made by bending the metal plate (for example a cold-rolled steel : SPC-C) stamped out in a U-shape with a press machine and the like, placed one upon the other. At both the end portions of the frame elements 14A, 14B, semi-cylindrical portions 15A, 15B, 16A, and 16B are formed by a bending process to make up the holding portions 15 and 16 which hold the anvil 21 and the inner sleeve 31 respectively, when the frame elements 14A and 14B are placed one upon the other, and in the neighborhood thereof, convex portions 17A, 17B and concave portions 18A, 18B are formed respectively.

Incidentally, these convex portions 17A, 17B and the concave portions 18A, 18B are processed at the same time when the metal plate is stamped out by a press machine.

As for the resin 13, a glass-fiber reinforced engineering plastic which has a low thermal expansion rate, and an approximate linear expansion coefficient to that of the frame 12, and is excellent in rigidity, heat resistance, burning resistance, and chemical resistance, here, polyphenylene sulfite (PPS) is used.

The inner sleeve 31 is made of metal (for example, free-machining leaded steel : SOM) through a cutting process and is provided with an insert cylinder portion 32 which is inserted into the inner sleeve holding portion 16 constituted of the semi-cylindrical portions 16A and 16B on the frame 12, a middle cylinder portion 33, and a screw cylinder portion 34 which is screwed with a screw portion 42 of the spindle 41.

The insert cylinder portion 32 is formed to have an inner diameter which is just fitted without gap to the outer diameter of the spindle when the spindle 41 is inserted to the cylinder. And as shown in FIG. 2, on the circumferential surface of the insert cylinder portion, a first circular projection 35 whose outer diameter is almost equal to the inner diameter of the inner sleeve holding portion 16 on the frame 12, second circular projections 36a and 36b whose outer diameter is smaller than the outer diameter of the first circular projection 35 and have bumpy outer surfaces made by a knurling tool, and circular treads 37a, 37b, and 37c which are provided on both sides of the first circular projection 35 and between the second circular projections 36a, 36b, respectively, and whose outer diameter is smaller than the outer diameter of the second circular projections 36a, 36b, are formed respectively. Incidentally, a cross sectional shape of circular treads 37a, 37b, and 37c is formed in a semi-circular groove so that the resin 13 is easy to go around the frame 12.

The middle cylinder portion 33 is formed to have an inner diameter slightly larger than the outer diameter of the spindle 41.

The screw cylinder portion 34 has a female screw 38 which is screwed with the screw portion 42 of the spindle 41 inside thereof, and has a slit 39 along the axial direction on the circumferential surface, and a nut 40 is screwed.

Figure 3:
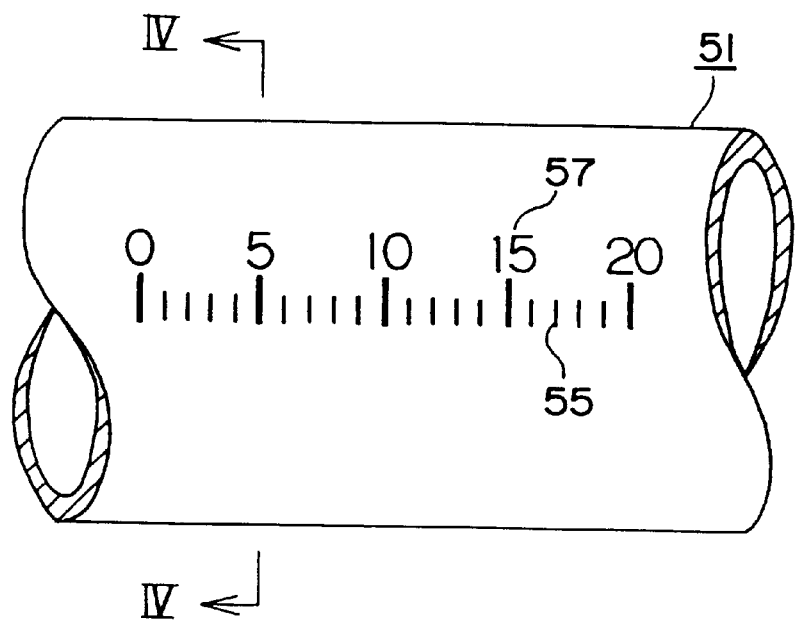
FIG. 3 is a front view showing an outer sleeve of the above embodiment.
Figure 4:
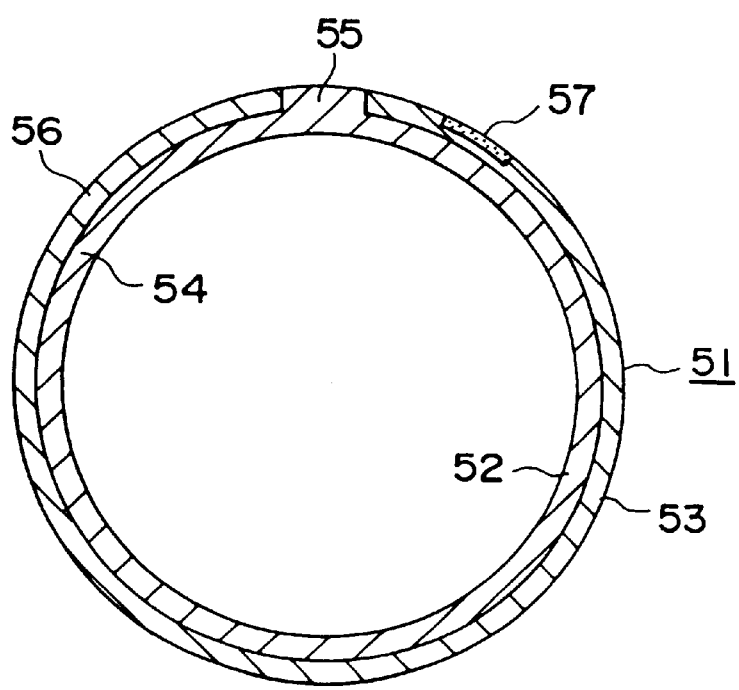
FIG. 4 is a sectional view taken along the IV—IV line in FIG. 3.

As shown in FIG. 3 and FIG. 4, the outer sleeve 51 is formed in a cylindrical shape through double-color injection molding using two kinds of resin 52 and 53 having two different colors. To be more specific, a cylindrical base tube 54 and a graduation 55 protruding toward the outside on the outer circumferential surface of the base tube 54 along the axial direction at predetermined intervals are molded by the resin 52, and an outside skin 56 which covers the outer surface of the base tube 54 excluding the graduation 55 portion, is molded by the resin 53. On the outside skin 56, numerals 57 are formed in accordance with the graduation 55 at the predetermined intervals by laser marking (a sign, letter or picture is drawn with laser irradiation by causing a change on the surface state at a point of irradiation). Here, the resin 52 is a black resin and the resin 53 is a white resin, both of which change the color into black when they are irradiated by a laser.

Figure 5:
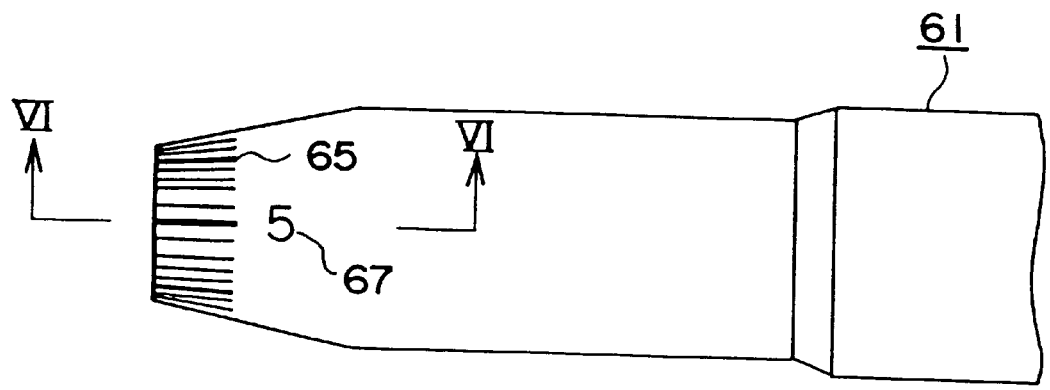
FIG. 5 is a front view showing a thimble of the above embodiment.
Figure 6:
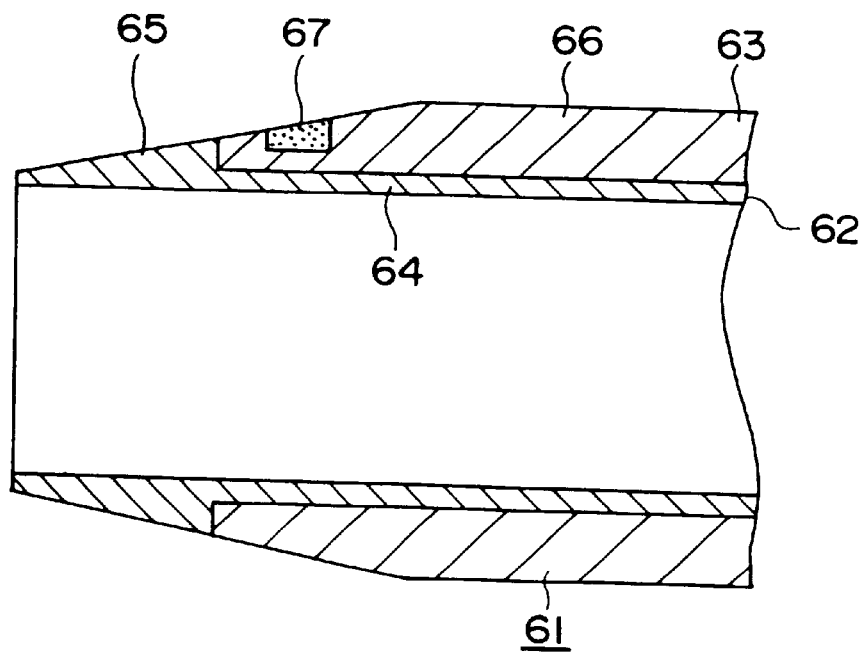
FIG. 6 is a sectional view taken along the VI—VI line in FIG. 5.

As shown in FIG. 5 and FIG. 6, the thimble 61 is molded in a cylindrical shape through double injection molding of two kinds of resin 62 and 63 which have different colors from each other. More specifically, with the resin 62, a cylindrical base tube 64 and graduations 65 protruding toward the outside at predetermined intervals on the circumferential surface at the end portion of the base tube 64, are molded, and with the resin 63, an outer skin 66 covering the outside of the base tube 64 except for the graduations 65 portion, is molded. On the outer skin 66, numerals 67 are formed in accordance with the graduations 65 at predetermined intervals by laser marking. Here, the resin 62 is a black resin and the resin 63 is a white resin, both of which change color into black when they are irradiated with a laser beam.

Incidentally, the resin 52, 53 which form the outer sleeve 51 and the resin 62, 63 which form the thimble 61, are not required to have the same high rigidity as the resin 13 which forms the main body 11, but a resin having heat resistance, burning resistance and chemical resistance is desirable.

The manufacturing method will be explained next.

The outer sleeve 51 and the thimble 61 are molded in advance.

Figure 7:
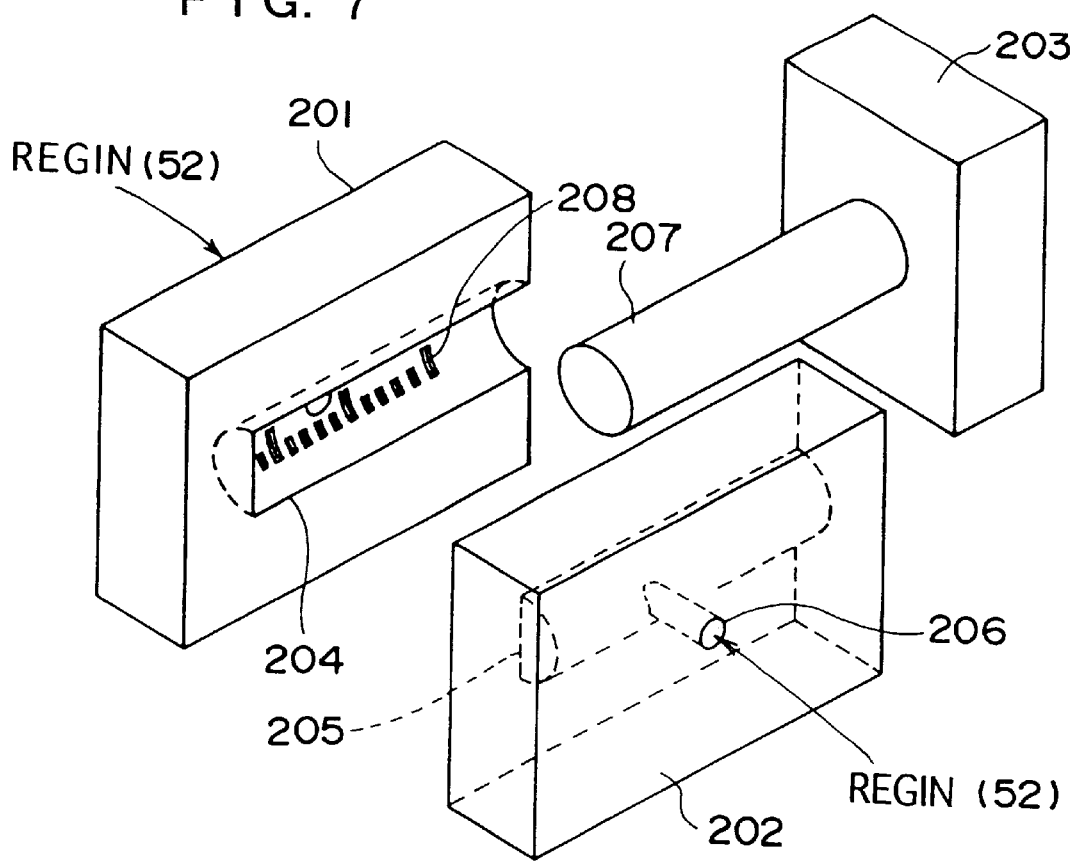
FIG. 7 is a perspectively exploded view showing divided molds for molding a primary molding product for the outer sleeve.
Figure 8:
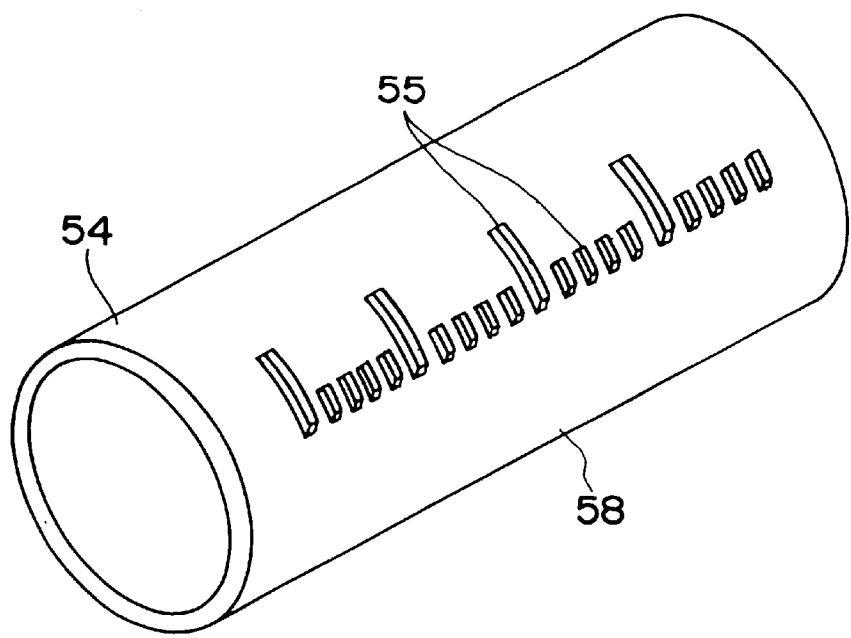
FIG. 8 is a perspective view showing the primary molding product molded using the divided molds of FIG. 7.

When the outer sleeve 51 is molded, as shown in FIG. 8, a primary molding product 58 having the cylindrical base tube 54 and the graduations 55 protruding outwardly at predetermined pitches along the axial direction on the outer circumference of the base tube 54 is molded using three divided molds 201, 202, and 203 as shown in FIG. 7.

The divided molds 201 and 202 are provided with semi-circular concave portions 204, 205, and a resin supply hole 206. The divided mold 203 is provided with a core 207 confronting the concave portions 204 and 205 at a predetermined clearance. When these divided molds 201, 202 and 203 are assembled together, a cylindrical cavity is formed between the concave portions 204, 205 and the core 207. And inside the concave portion 204, a graduation-forming groove 208 to form the graduations 55 is provided. Thus, when the three divided molds 201, 202, and 203 are assembled together, resin 52 is filled in through the resin supply hole 206 and the molds are opened after the resin is cooled and solidified, a primary molding product 58 having the graduations 55 on the outer circumference of the base tube 54 can be obtained.

Figure 9:
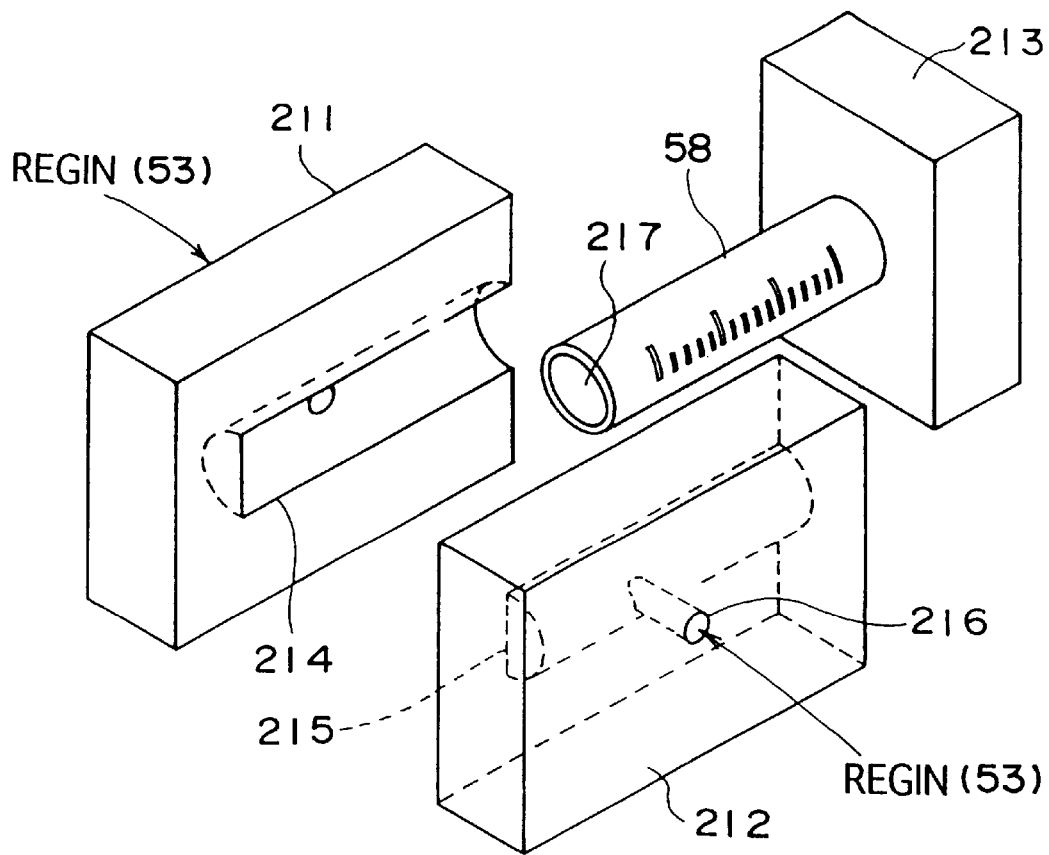
FIG. 9 is a perspectively exploded view showing divided molds for molding a secondary molding product for the outer sleeve.
Figure 10:
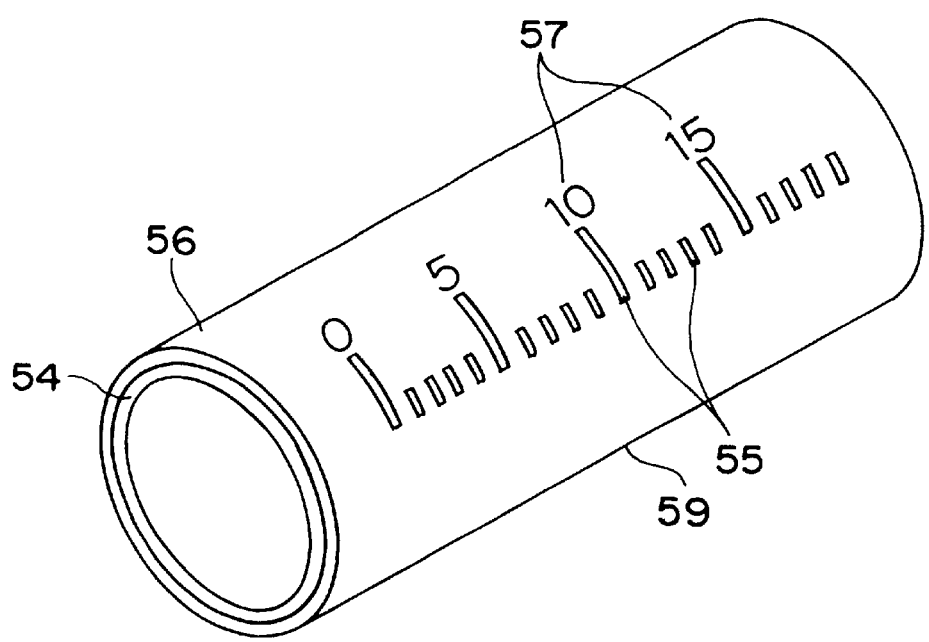
FIG. 10 is a perspective view showing the secondary molding product molded using the divided molds of FIG. 9.

Next, using three divided molds 211, 212 and 213 shown in FIG. 9, the outer skin 56 is formed on the outside of the base tube 54 except for the graduation portion 55 as shown in FIG. 10.

Semi-circular concave portions 214, 215 and a resin supply hole 216 are provided on the divided molds 211 and 212, and a core 217 which fits the primary molding product 58 is provided on the outside of the divided mold 213, so that a cylindrical cavity is formed between the concave portions 214, 215 and the primary molding product 58 when these divided molds 211, 212, and 213 are assembled. Thus, when the three divided molds 211, 212 and 213 are assembled, the resin 53 is filled in through the resin supply hole 216 and the molds are opened after the resin 53 is cooled and solidified, a secondary molding product 59 having the outer skin 56 formed on the outside of the base tube 54 except for the graduation portion 55 can be obtained.

Next, numerals 57 are formed on the outer skin 56 of the secondary molding product 59 with a laser marking. In order to form the numerals, a laser beam is radiated on the outer skin 56 with attaching a mask on which numerals are formed. Then the numerals 57 are formed by changing the color of the radiated portion into black, to form the outer sleeve 51.

Figure 11:
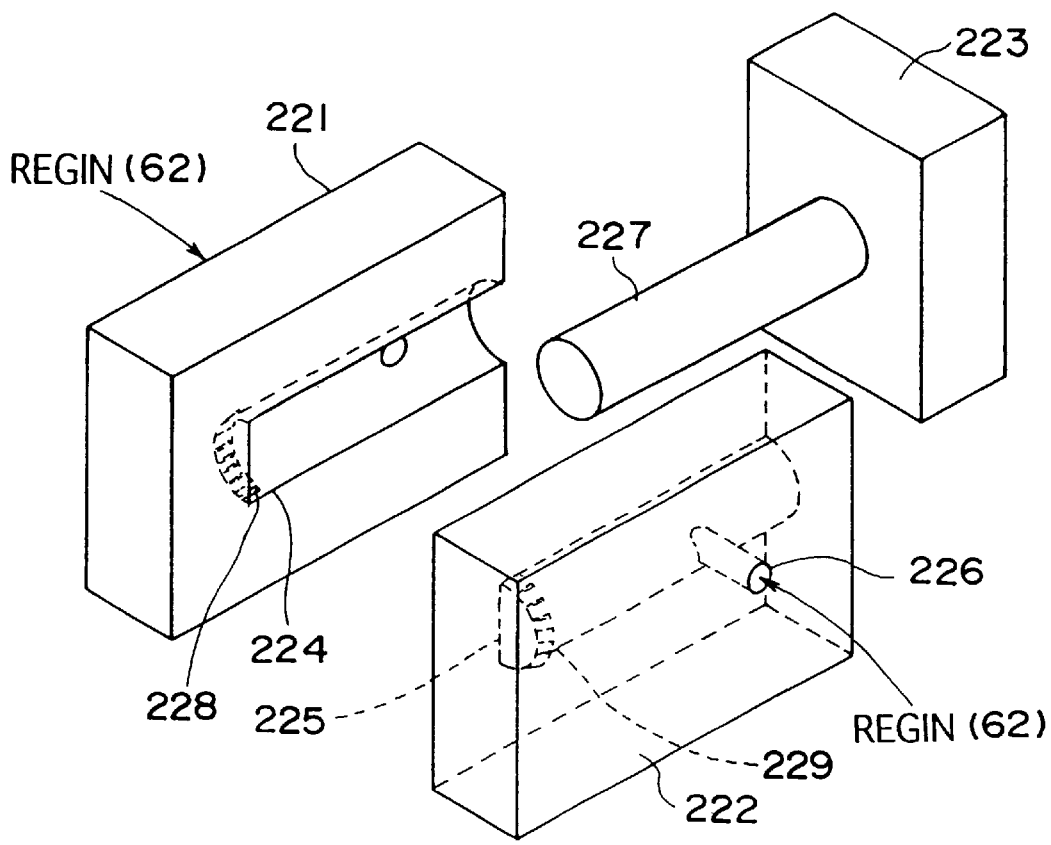
FIG. 11 is a perspectively exploded view showing divided molds for molding a primary molding product for the thimble.
Figure 12:
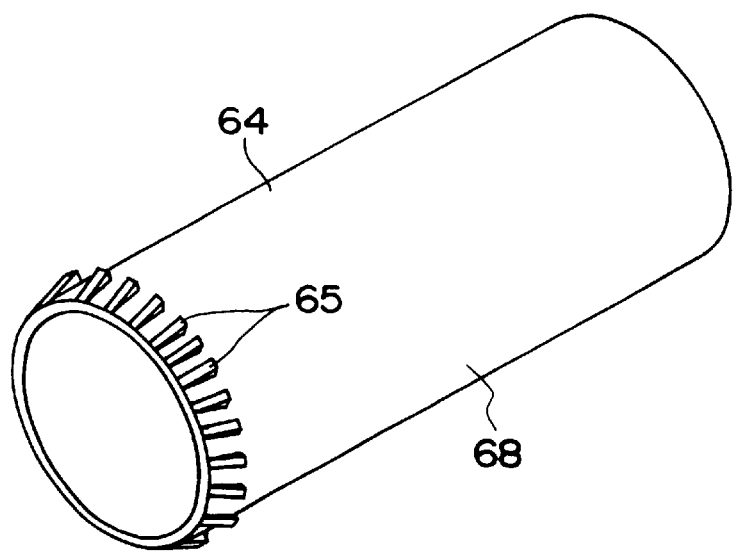
FIG. 12 is a perspective view of the primary molding product molded using the divided molds of FIG. 11.

In order to mold-the thimble 61, with using three divided molds 221, 222, and 223 shown in FIG. 11, a primary molding product 68 is molded, the primary molding product having the cylindrical base tube 64 and the graduations 65 protruding outwardly on the outer circumference of the base tube 64 at predetermined intervals as shown in FIG. 12.

The divided molds 221 and 222 are provided with semi-circular concave portions 224, 225, and a resin supply hole 226. The divided mold 223 is provided with a core 227 confronting the concave portions 224 and 225 at a predetermined clearance. When these divided molds 221, 222 and 223 are assembled together, a cylindrical cavity is formed between the concave portions 224, 225 and the core 227. And inside the concave portion 224 and 225, graduation-forming grooves 228 and 229 to form the graduations 65 are formed. Thus, when the three divided molds 221, 222, and 223 are assembled, the resin 62 is filled in through the resin supply hole 226 and the molds are opened after the resin 62 is cooled and solidified, to obtain the primary molding product 68 having the graduations 65 on the outer circumference of the base tube 64.

Figure 13:
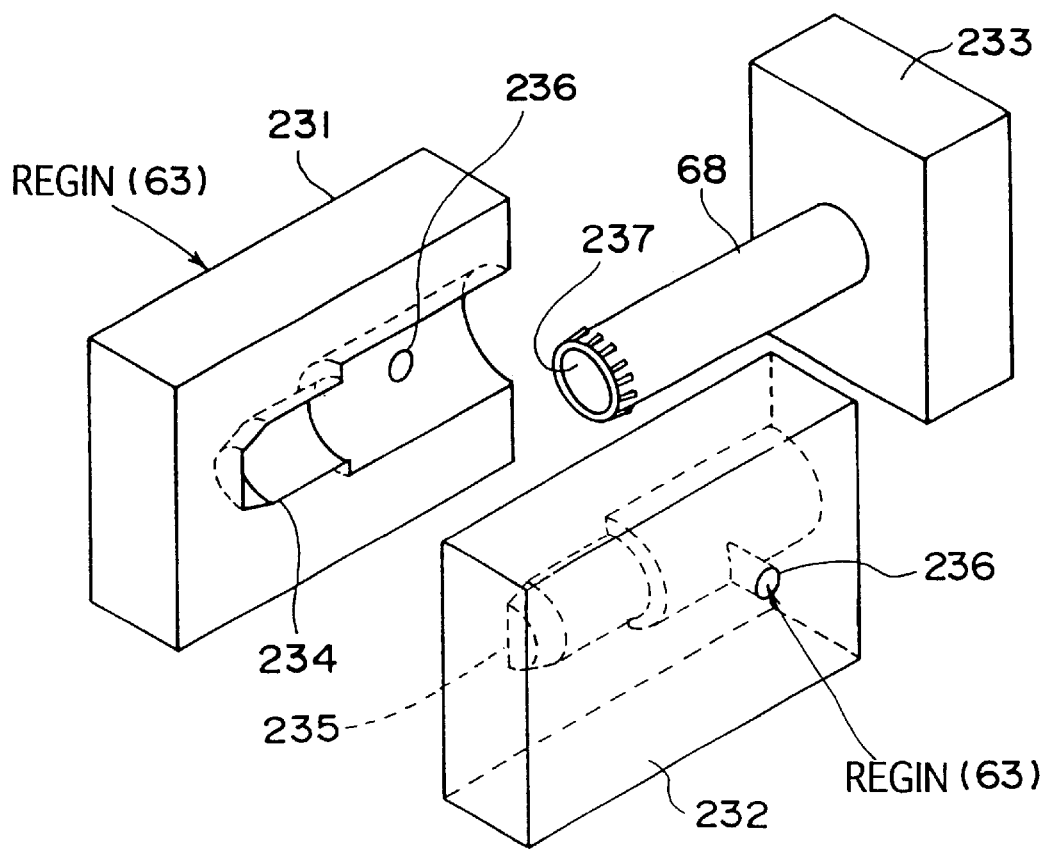
FIG. 13 is a perspectively exploded view showing divided molds for molding a secondary molding product for the thimble.
Figure 14:
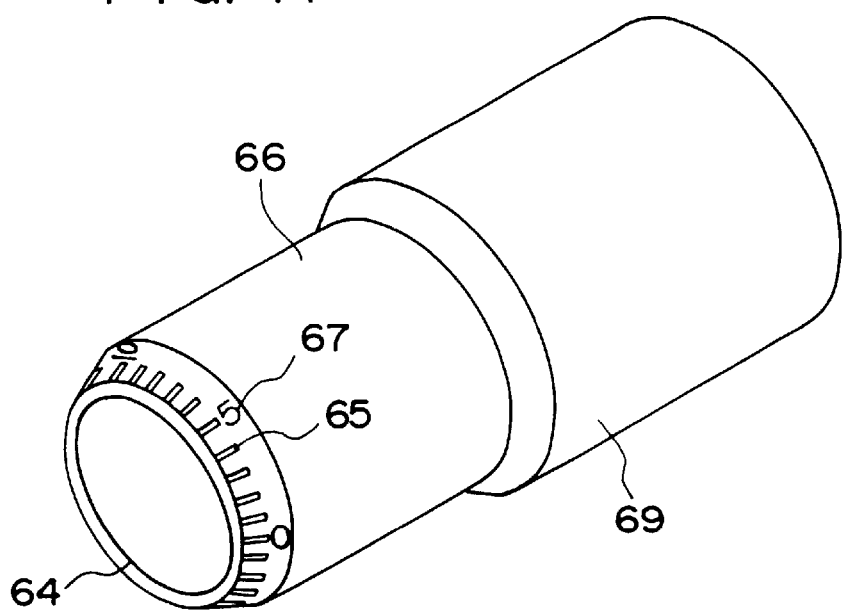
FIG. 14 is a perspective view of the secondary molding product molded using the divided molds of FIG. 13.

Next, using three divided molds 231, 232 and 233 shown in FIG. 13, the outer skin 66 is formed on the outside of the base tube 64 except for the graduation portion 65 as shown in FIG. 14.

Semi-circular concave portions 234, 235 having two different diameters and a resin supply hole 236 are provided on the divided molds 231 and 232, and a core 237 which fits the primary molding product 68 is provided,on the outside of the divided mold 233, so that a cylindrical cavity is formed between the concave portions 234, 235 and the primary molding product 68 when these divided molds 231, 232 and 233 are assembled. Thus, when the three divided molds 231, 232 and 233 are assembled, the resin 63 is filled in through the resin supply hole 236 and the molds are opened after the resin is cooled and solidified, a secondary molding product 69 having the outer skin 66 formed on the outside of the base tube 64 except for the graduation portion 65.

Next, numerals 67 are formed on the outer skin 66 of the secondary molding product 69 by means of a laser marking. In order to form the numerals, a laser beam is radiated on the outer skin 66 with attaching a mask on which numerals are formed. Then the numerals 67 are formed by changing the color of the radiated portion into black, to form the thimble 61.

When manufacturing a micrometer, a pair of the frame elements 14A and 14B are prepared by stamping and bending process of a metal sheet and put them together one on another to integrate in a manner that the convex portion 17A fits the concave portion 18A and the convex portion 17B fits the concave portion 18B. Then the semi-cylindrical portions 15A and 15B,. 16A and 16B, of each frame elements 14A and 14B are put together to form the anvil holding portion 15 and the inner sleeve holding portions 16. So the anvil 21 and the insert cylinder portion 32 of the inner sleeve 31 can be inserted through the anvil holding portion 15 and the inner sleeve holding portion 16.

After the frame 12 thus prepared is set in the cavity of the mold as an inserting part, the resin 13 is inserted and filled up into the cavity. The resin 13 thus filled into the cavity covers the outer surface of the frame 12 and at the same time flows into the gap between the anvil holding portion 15 and the anvil 21, and the gap between the inner sleeve holding portion 16 and the insert cylinder portion 32 of the inner sleeve 31 (refer to FIG. 1). Then, the frame 12, the anvil 21 and the inner sleeve 31 are integrally connected with each other.

Next, the outer sleeve 51 is put and fixed on the outside of the inner sleeve 3L the spindle 41 being inserted into the inside of the inner sleeve 31 and the screw member 42 of the spindle 41 is screwed to the female screw 38 of the inner sleeve 31. Here, the clearance between the spindle 41 and the inner sleeve 31 is adjusted by the nut 40. Then the thimble 61 is put on the outside of the outer sleeve 51 and the thimble 61 and the spindle 41 are unified with the ratchet mechanism 71. Thus, the micrometer is produced.

According to the present embodiment, since the main body 11 which holds the anvil 21 at one end and the spindle 41 at the other end through the inner sleeve 31 is prepared with the frame 12 formed by stamping and bending of metal plate, it is possible to reduce cost and weight compared with the casted article obtained by conventional casting, while keeping the rigidity required during the measurement and the accuracy against the temperature change of the working environment. Therefore the improvement of handling properties and operability can be expected.

Since the outer sleeve 51 and the thimble 61 as well as the main body 11 are molded with the resin 52, 53, 62 and 63, the weight of the whole micrometer can be reduced. Therefore, from this point, the improvement of handling properties and operability can also be expected. Moreover, since the weight of the micrometer is reduced not partially but totally, the weight balance which is an important property in using a micrometer can be maintained well.

The outer sleeve 51 and the thimble 61 are molded including the graduations 55 and 65 by means of a double-color injection molding method using two differently colored resins 52, 53 and 62, 63 and then the numerals 57 and 67 are formed by means of the laser marking method. Thus the manufacturing of the outer sleeve and the thimble can be simplified with a low cost.

Furthermore, since the outer surface of the frame 12 is covered with the resin 13 by injection molding, using the frame 12 as an inserting part, the heat of hand is not directly transferred to the frame 12, when the frame 12 is grasped by hand at the time of measurement. Therefore it is possible to restrain the influence of thermal expansion by the heat of hand while the weight reduction can be achieved.

Besides, since the outer sleeve 51 and the thimble 61 are also molded with the resin 52, 53, 62 and 63, the heat from fingers is hard to transfer to the spindle 41, when the thimble 61 is turned with the fingers. Therefore, it is possible to restrain the influence of thermal expansion by the heat of hand.

And since a pair of the frame element 14A and 14B which are prepared by stamping and bending a metal plate and placed one upon the other is used for the frame 12, the rigidity of the frame 12 is enhanced. And the frame can be easily produced because what is required is only several sheets of the frame elements 14A and 14B stamped: out with a press machine and the like, and placed one upon the other.

Besides, since the convex portions 17A, 17B are formed on one of the frame elements 14A and 14B, and the concave portions 18A, 18B are formed on the other of the frame elements 14A and 14B, a pair of the frame elements 14A, 14B can be easily placed one upon the other with high accuracy by only fitting them to each other.

Since the semi-cylindrical portions 15A, 15B, 16A and 16B are formed on each frame element 14A and 14B, the circular anvil holding portion 15 and the inner sleeve holding portion 16 can be constructed when a pair of the frame elements 14A and 14B are placed one upon the other.

Additionally, the anvil 21 is inserted into the anvil holding portion 15, and the insert cylinder portion 32 of the inner sleeve 31 is inserted into the inner sleeve holding portion 16.

Since the injection molding of the resin 13 is carried out by using the above structure as an inserting part, the above portions can be integrally connected with each other through the resin 13. Owing to the above configuration, the rigidity of the total system can be enhanced.

And since the first circular projection 35 whose outer diameter is almost equal to the inner diameter of the inner sleeve holding portion 16 of the frame 12, the second circular projections 36a and 36b which have smaller outer diameters than the outer diameter of the first circular projection 35 and have a bumpy outer surface, and the circular treads 37a, 37b, and 37c which have smaller outer diameters than the outer diameters of the second circular projections 36a and 36b, are provided on the circumferential surface of the insert cylinder portion 32 of the inner sleeve 31, it becomes possible to decide the position of the frame 12 by means of the first circular projection 35, and it becomes possible to ensure the connectivity along the radial direction by means of the second circular projections 36a and 36b, and to ensure the connectivity along the thrust direction by means of the circular treads 37a, 37b, and 37c.

Though the frame 12 is formed with a pair of the frame elements 14A and 14B placed one upon the other in the above embodiment, it is acceptable to form the frame with only one sheet of the frame element or, three or more sheets of the frame elements.

As a measure to enhance the rigidity of the frame 12 when necessary, a rib may be formed along the outer peripheral end portion of each frame element 14A and 14B.

In the above embodiment, the outside surface of the frame 12 is covered with the resin 13, but the covering with the resin 13 can be omitted, or the frame 12 may be coated with a coating agent having heat resistance, burning resistance, and chemical resistance.

In the above embodiment, after the outer sleeve 51 and the thimble 61 are molded including the graduations 55 and 65 through double-color injection molding with two different colored resins 52, 53, 62 and 63, the numerals 57 and 67 are formed through laser marking, but the numerals may be formed by removing the portions of the numerals 57 and 67 with a radiation of laser beam, or the graduations 55 and 65 as well as the numerals 57 and 67 may be molded from the beginning with the resin 52 and 62 which are used to mold the base tube 54 and 64.

Figure 15:
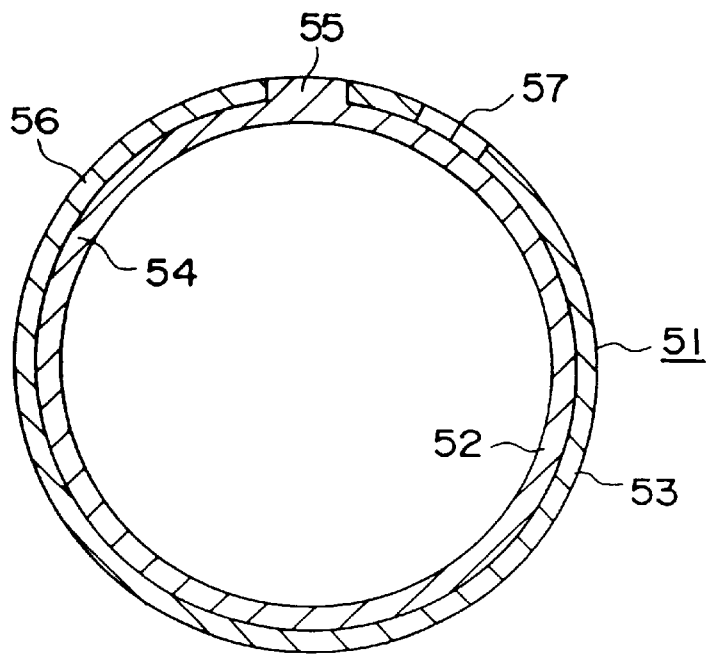
FIG. 15 is a sectional view showing another embodiment for an outer sleeve.
Figure 16:
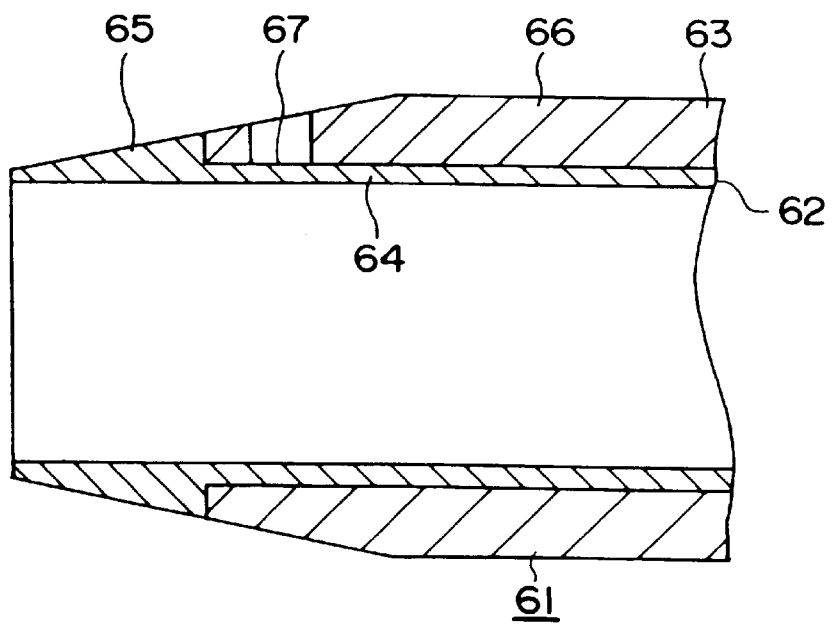
FIG. 16 is a sectional view showing another embodiment for a thimble.

That is, as shown in FIG. 15 and FIG. 16, resin which can be peeled by radiation of a laser beam may be used for the resin 53 and 63 for the outer skin 56, 66 of the outer sleeve 51 and the thimble 61 so that the radiated portion is peeled off by radiation of the laser beam and the black colored resin 52, 53 which are formed at the bottom of the groove appear as the numerals 57 and 67.

Figure 17:
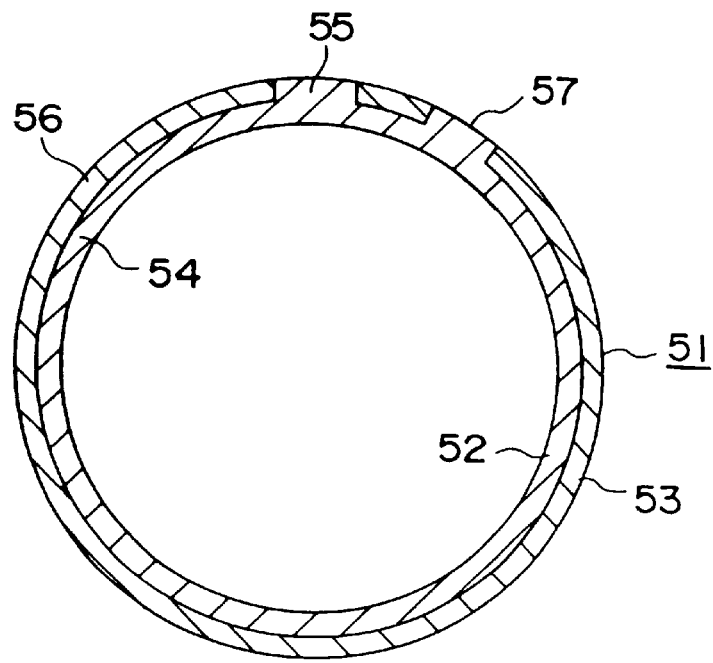
FIG. 17 is a sectional view showing still another embodiment for an outer sleeve.
Figure 18:
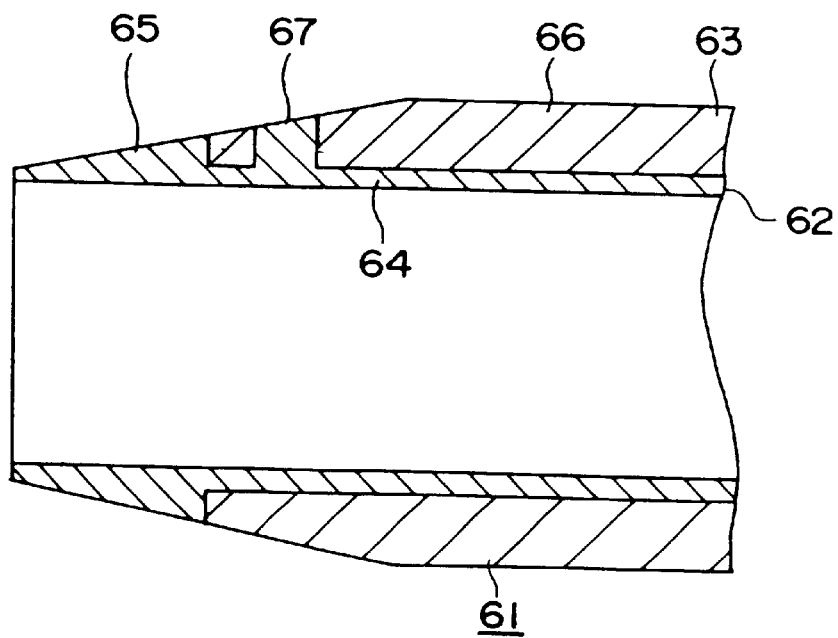
FIG. 18 is a sectional view showing further embodiment for a thimble.
Figure 19:
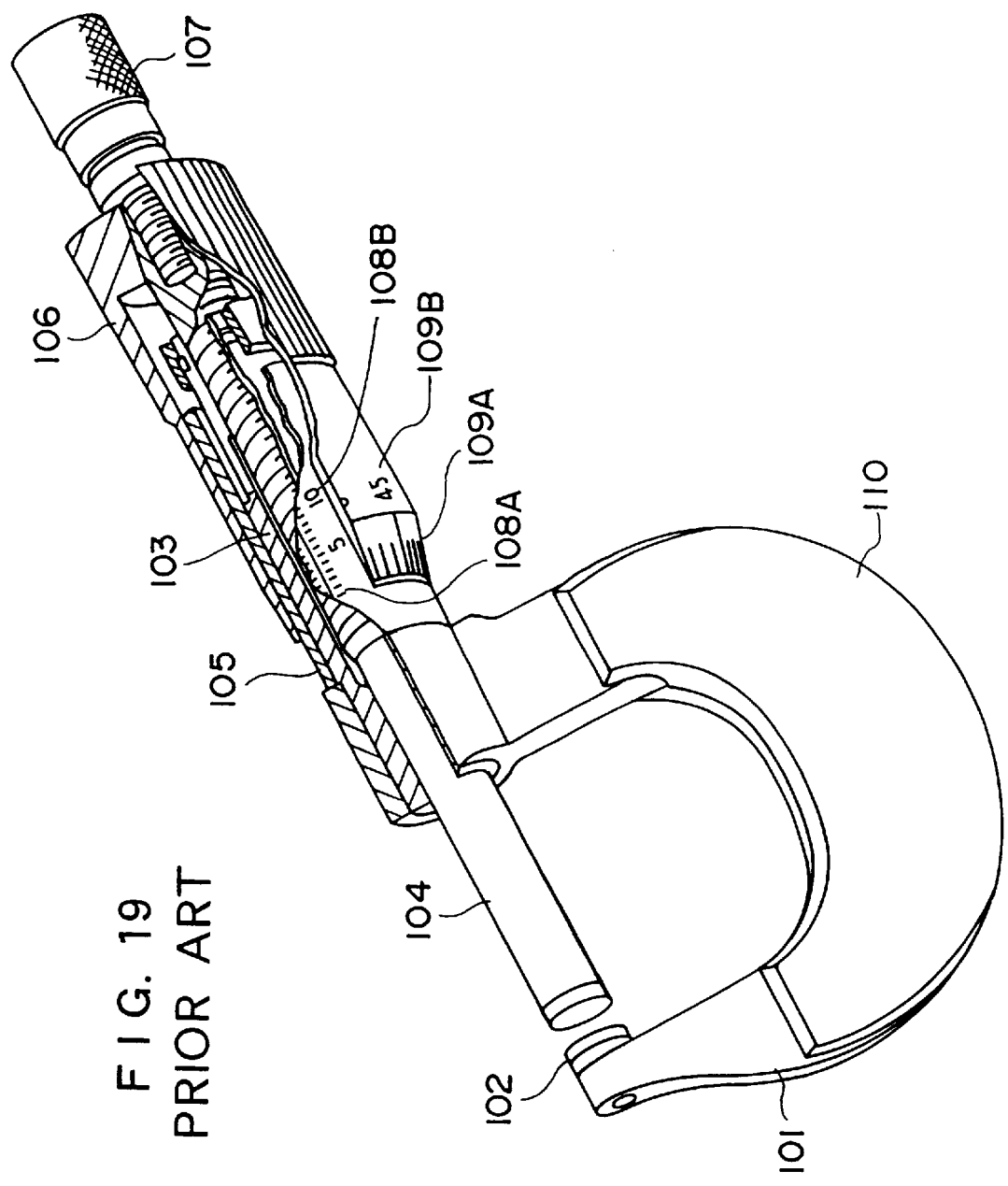
FIG. 19 is a perspective view showing a conventional micrometer.

Alternatively, as shown in FIG. 17 and FIG. 18, the numerals 57 and 67 as well as the graduations 55 and 65 may be integrally formed on the outer circumference of the base tubes 54 and 64 of the outer sleeve 51 and the thimble 61 with the resin 52 and 62.

In the above embodiment, the graduations 55, 65 and the numerals 57, 67 are made in black and the ground in white, but the color combination can be reverse. The point is, colors to be used should be distinguishable between the graduations 55, 65 and the numerals 52, 62, and the combination of colors is optional.

In the above embodiment, in forming the outer sleeve 51 and the thimble 61, the divided molds for molding the primary molding products 58, 68 and the divided molds for molding the secondary molding products 59, 69 separately prepared. However, the primary molding products 58, 68 and the secondary molding products 59, 69 may be formed by sliding or rotatingly moving the movable molds, thus attaching the two movable molds to the two stationary molds in due order.

In the above embodiment, the outer sleeve 51 and the thimble 61 are formed through double-color injection molding using two kinds of resin 52, 53, 62, 63 having two different colors. However, only one of the outer sleeve 51 and the thimble 61 may be formed through the double-color injection molding.

According to the micrometer in the present invention, at least either the outer sleeve or the thimble is composed of the base tube which is formed of the first resin with graduations protruding outwardly on the outer circumference thereof at predetermined intervals and the outer skin covering the outer circumference of the tube except for the graduations being formed of the second resin of the color different from the first resin, which makes it possible to lower the manufacturing cost and the weight as compared with the conventional micrometers.

According to the method for manufacturing the cylindrical component for a micrometer of the present invention, after a primary molding product having a base tube and graduations protruding outwardly on the outer circumference thereof is formed of the first resin, an outer skin is formed of the second resin having a different color from that of the first resin by covering the outside of the base tube except for the graduations, and then the numerals are formed by irradiating a laser beam on the outer skin. Therefore, the manufacturing cost and the weight are reduced as compared with the conventional manufacturing method of cylindrical component for a micrometer such as an outer sleeve and a thimble.

What is claimed is:

1. A method for manufacturing a cylindrical component for a micrometer, the cylindrical component having graduations and numerals on the outer circumferential surface of a base tube thereof along the axial direction, comprising the steps of:

molding primary molding product by a first resin, the primary molding product having the base tube and the graduations protruding outwardly on the outer circumferential surface of the base tube along the axial direction at predetermined intervals;

forming outer skin by a second resin to cover the outside of the base tube except for the graduations, the second resin having a different color from that of the first resin; and irradiating a laser beam on the outer skin to form the numerals thereon.

2. The method for manufacturing the cylindrical component for the micrometer according to claim 1, wherein the second resin is a resin which changes color thereof by irradiation of a laser beam, and wherein a laser beam is irradiated on the second resin to change color thereof on the irradiated portion to form the numerals by the discolored layer.

3. The method for manufacturing the cylindrical component for the micrometer according to claim 1, wherein the second resin is a resin peelable by irradiating a laser beam, and wherein a laser beam is irradiated on the second resin to peel off the irradiated portion of the second resin and to form the numerals by slits thereby formed.

4. The method for manufacturing the cylindrical component for a micrometer according to claim 1, wherein said cylindrical component is an outer sleeve.

5. The method for manufacturing the cylindrical component for a micrometer according to claim 1, wherein said cylindrical component is a thimble.

\* \* \* \* \*